(12) United States Patent
Hudson

(10) Patent No.: US 7,111,983 B2
(45) Date of Patent: Sep. 26, 2006

(54) TEMPERATURE DETECTION METHOD AND APPARATUS FOR INVERTER-DRIVEN MACHINES

(75) Inventor: Jeffrey A. Hudson, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 10/823,178

(22) Filed: Apr. 13, 2004

(65) Prior Publication Data

US 2005/0226308 A1 Oct. 13, 2005

(51) Int. Cl.
- *G01K 1/08* (2006.01)
- *G01K 1/14* (2006.01)
- *G01K 13/08* (2006.01)
- *G01R 31/00* (2006.01)

(52) U.S. Cl. .................. 374/152; 374/208; 374/141; 324/525; 324/545

(58) Field of Classification Search .............. 374/185, 374/57, 141, 152–153, 45, 47, 4; 361/24–25, 361/27; 324/557–558, 512–513, 519, 522, 324/525, 551, 547, 754, 772, 127, 545
See application file for complete search history.

(56) References Cited

U.S. PATENT DOCUMENTS

| | | | | |
|---|---|---|---|---|
| 1,818,785 | A | * | 8/1931 | Blume .................. 374/152 |
| 3,305,698 | A | * | 2/1967 | Bargen et al. .............. 361/27 |
| 3,521,212 | A | * | 7/1970 | Buiting et al. .............. 338/25 |
| 3,899,704 | A | * | 8/1975 | Leistner .................. 310/183 |
| 3,960,017 | A | * | 6/1976 | Romanowski ............. 374/152 |
| 4,071,875 | A | * | 1/1978 | Kochem .................. 361/113 |
| 4,092,864 | A | * | 6/1978 | Romanowski ............. 374/152 |
| 4,266,257 | A | * | 5/1981 | Rudich, Jr. .............. 361/27 |
| 4,413,325 | A | * | 11/1983 | Elfner et al. ............. 702/132 |
| RE31,685 | E | * | 9/1984 | Weiler .................. 374/152 |
| 4,547,769 | A | * | 10/1985 | Tanigaki et al. ............ 340/626 |
| 4,683,515 | A | * | 7/1987 | Beihoff et al. ............ 361/106 |
| 4,716,486 | A | * | 12/1987 | Sobiepanek et al. ......... 361/24 |

(Continued)

FOREIGN PATENT DOCUMENTS

DE 3241147 A * 5/1984

(Continued)

*Primary Examiner*—Gail Verbitsky
(74) *Attorney, Agent, or Firm*—Patrick S. Yoder; Alexander M. Gerasimow

(57) ABSTRACT

A resistance temperature detector device and system are provided for measuring the temperature adjacent to windings within a stator assembly. The resistance temperature detector comprises a resistive element enclosed within a plurality of insulative layers, including insulation panels and adhesive. These surrounding insulation layers are sufficient to prevent partial discharge within any air gaps or low dielectric materials adjacent to the resistive element when the resistance temperature detector is disposed within a motor. A method for detecting temperatures between windings of an electrical machine is also provided.

10 Claims, 6 Drawing Sheets

U.S. PATENT DOCUMENTS

| | | | |
|---|---|---|---|
| 4,751,488 A * | 6/1988 | Lanoue et al. | 336/84 R |
| 4,766,387 A * | 8/1988 | Browne et al. | 324/545 |
| 4,831,313 A * | 5/1989 | Beilfuss | 388/822 |
| 5,019,760 A * | 5/1991 | Chu et al. | 318/490 |
| 5,514,967 A * | 5/1996 | Zelm | 324/551 |
| 6,225,813 B1 * | 5/2001 | Garwatoski | 324/690 |
| 6,351,202 B1 * | 2/2002 | Ito et al. | 336/15 |
| 6,639,505 B1 * | 10/2003 | Murata et al. | 338/25 |
| 6,794,883 B1 * | 9/2004 | Klingel | 324/522 |
| 6,817,760 B1 * | 11/2004 | Mende et al. | 374/152 |
| 6,975,102 B1 * | 12/2005 | Ohminami | 324/73.1 |
| 7,033,073 B1 * | 4/2006 | Hoppe | 374/187 |
| 2002/0048312 A1 * | 4/2002 | Schurr et al. | 374/208 |
| 2003/0178999 A1 * | 9/2003 | Klingel | 324/522 |
| 2004/0091017 A1 * | 5/2004 | Gramsamer et al. | 374/152 |
| 2004/0188674 A1 * | 9/2004 | Gates et al. | 257/40 |
| 2004/0263342 A1 * | 12/2004 | Matlock et al. | 340/648 |

FOREIGN PATENT DOCUMENTS

| | | | |
|---|---|---|---|
| JP | 58055768 A | * | 4/1983 |
| JP | 04045180 A | * | 2/1992 |
| JP | 09103050 A | * | 4/1997 |

* cited by examiner

TEMPERATURE DETECTION METHOD AND APPARATUS FOR INVERTER-DRIVEN MACHINES

BACKGROUND

The present technique relates generally to the field of electric motors and to methods and apparatus for detecting temperatures within an electric motor. More particularly, the technique relates to a novel approach to detecting the temperature adjacent to a winding within an electric motor.

Electric motors, generators, and other similar devices, are produced in a variety of mechanical and electrical configurations. The configuration of these devices may depend upon the intended application, the operating environment, the available power source, or other similar factors. In general, these devices include a rotor surrounded at least partially by a stator. For instance, one common design of electrical motor is the induction motor, which is used in numerous and diverse applications. Induction motors typically employ a stator assembly including a slotted core in which groups of coil windings are installed. By providing alternating current power to certain windings at certain times, a dynamic magnetic field is produced that causes the rotor to rotate within the stator. The rotational speed of the rotor is a function of the frequency of the alternating current power input and of the motor design (i.e. the number of poles defined by the windings). This rotation may be used to transmit a mechanical force to a driven load via an output shaft coupled between the rotor and the driven load.

Inverter drives are commonly used with such motors to vary the frequency of the alternating current power driving the motor. This, accordingly, allows the rotational speed of the rotor to be varied as well. An inverter drive is configured to receive a direct current input and to output a variable frequency waveform that simulates alternating current power. A rectifying circuit may be used with the inverter drive if alternating current power is being provided to the inverter drive. In such a case, the rectifier converts the incoming alternating current power to direct current power for input into the inverter circuitry.

Electric motors and other similar devices are generally configured to operate in a given temperature range. Heat is generated within the motor from the passage of electrical current through the coil windings, or from a variety of other sources. Often, one or more resistance temperature detectors will be disposed within one or more slots of a stator core, adjacent to the coil windings. In this manner, the temperature of the coil windings can be measured to determine if the temperature is within desired operating parameters. However, these resistance temperature detectors must remain operable in order to provide this benefit.

In general, a resistance temperature detector includes a resistance coil encased in an insulative cover. Current is applied to leads of the coil that results in a measurable voltage drop through the coil as a function of the resistance of the coil. Because the resistance varies with the temperature of the coil, by measuring the voltage drop, compensating for certain errors, and correlating the voltage drop to the known characteristics of the coil, the temperature at the detector location can be calculated. In motor applications this temperature signal may then be used for various monitoring, control, preventative maintenance, and other functions.

The environments in which conventional resistance temperature detectors are placed are often severe, particularly in high power motors. The detectors are subjected to elevated temperature levels and, at times to significant voltage differentials, particularly in inverter driven applications. The corresponding voltage stress and electric field within these environments may lead to premature failure of resistance temperature detectors. Particularly, the electric field within the motor may electrically break down small air gaps or other materials or zones of reduced dielectric constant within a resistance temperature detector, causing partial discharge and localized heating within such zones. If any air voids or low dielectric materials are disposed adjacent to the resistive element of the detector, this localized heating may cause the detector to report inaccurate temperatures or may cause the resistive element to deteriorate, resulting in the failure of the detector. Moreover, winding insulation systems are being further reduced in thickness, leading to increasing voltage stresses, particularly across temperature detector insulating layers. Such elevated stresses can similarly lead to failure of the detectors.

There is, therefore, a need for a resistance temperature detector that can better withstand the harsh electrical environment present in many applications, and particularly within a slot of a stator core. Such a device would allow for the monitoring of temperatures of windings of electric motors or similar devices, and thereby prevent damage and downtime, and improve reliability of the entire motor system.

BRIEF DESCRIPTION

The present technique provides a novel technique for measuring the temperature within an electrical device. The technique is applicable to a wide range of equipment, but is particularly well suited to measuring the temperature within the stator assembly of an electric motor.

In accordance with a first aspect of the technique, a resistance temperature detector suitable for detecting temperatures between windings of an electrical machine is provided. This detector includes a resistive element and a detector insulating system disposed about and completely encasing the resistive element. The resistive element is configured to receive an input signal and to produce an output signal that is a function of temperature. The provided detector insulating system disposed about the resistive element may have a capacitance per unit area approximately equal to or greater than the capacitance per unit area of the winding insulating system.

In particular, a resistance temperature detector is provided wherein a detector insulating system disposed about a resistive element may have a capacitance per unit area of sufficient magnitude that a voltage stress level experienced by any air voids or low dielectric materials adjacent to the resistive element resulting from voltage applied to the windings during operation is below a stress level that would cause partial discharge in such voids and materials.

In accordance with another aspect of the technique, a resistance temperature detector system for detecting temperatures between windings of an electrical machine is provided. The system comprises a winding configured to receive an alternating current voltage waveform during operation. The winding has a winding insulating system disposed about a central conductor. A resistance temperature detector, comprising a resistive element disposed within an insulation system, is disposed adjacent to the winding for detecting a temperature of the winding during operation. The combination of the winding insulating system and the detector insulating system have a capacitance sufficient that a voltage stress level experienced by any air voids or low dielectric materials adjacent to the resistive element resulting from voltage applied to the winding during operation is below a stress level that would cause partial discharge in such voids and materials.

The technique also offers a method for detecting temperatures between windings of an electrical machine. The method comprises steps for providing a resistive element configured to receive a measurement signal and to produce an output signal that is a function of temperature. The resistive element is disposed within a detector insulating system, the detector insulating system having a desired capacitance per unit area of sufficient magnitude that a voltage stress level experienced by any air voids or low dielectric materials adjacent to the resistive element resulting from voltage applied to the windings during operation is below a stress level that would cause partial discharge in such voids and materials.

DRAWINGS

The foregoing and other advantages and features of the invention will become apparent upon reading the following detailed description and upon reference to the drawings in which.

Figure 7:
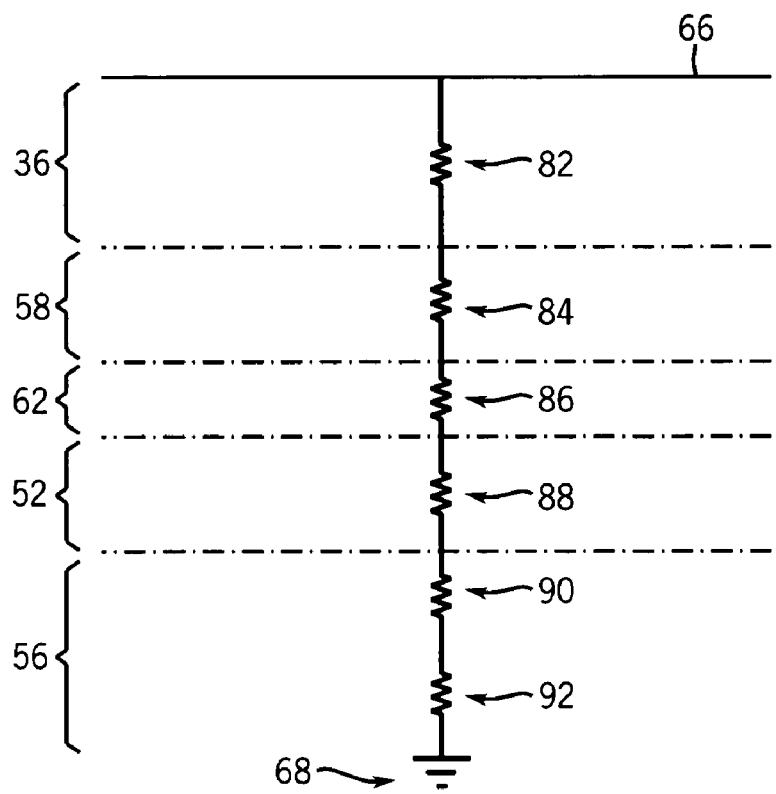
Figure 8:
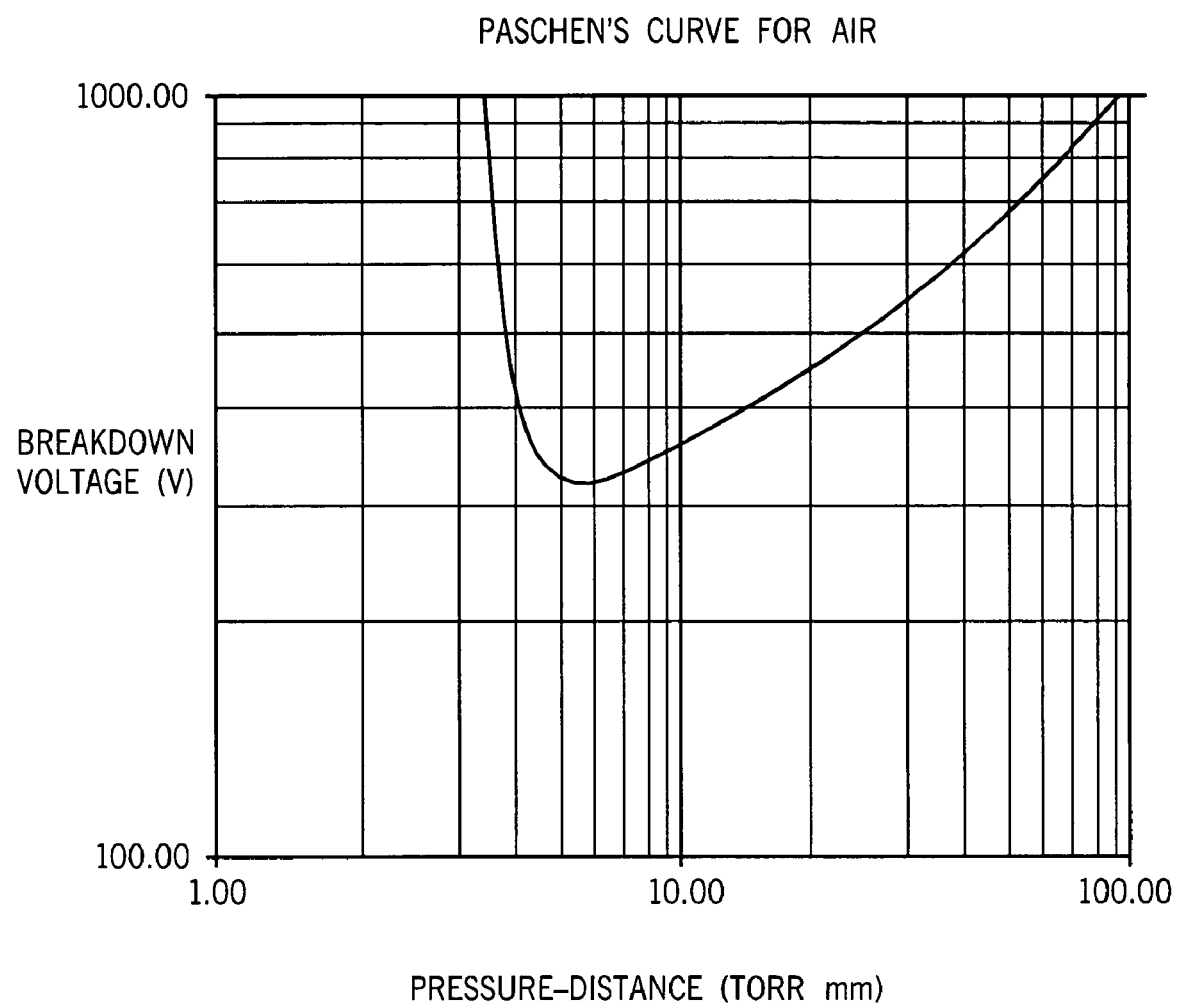

FIG. 7 is a model of an equivalent electrical circuit representative of the reactive characteristics associated with the capacitance of exemplary layers between a winding and an element of a resistance temperature detector disposed in a slot of a stator core in accordance with certain aspects of the invention; and FIG. 8 is a graphical representation of Paschen's Law as applicable to air, which may be used as a basis for anticipating a point of partial discharge breakdown for the design of the present detector system.

DETAILED DESCRIPTION

Figure 1:
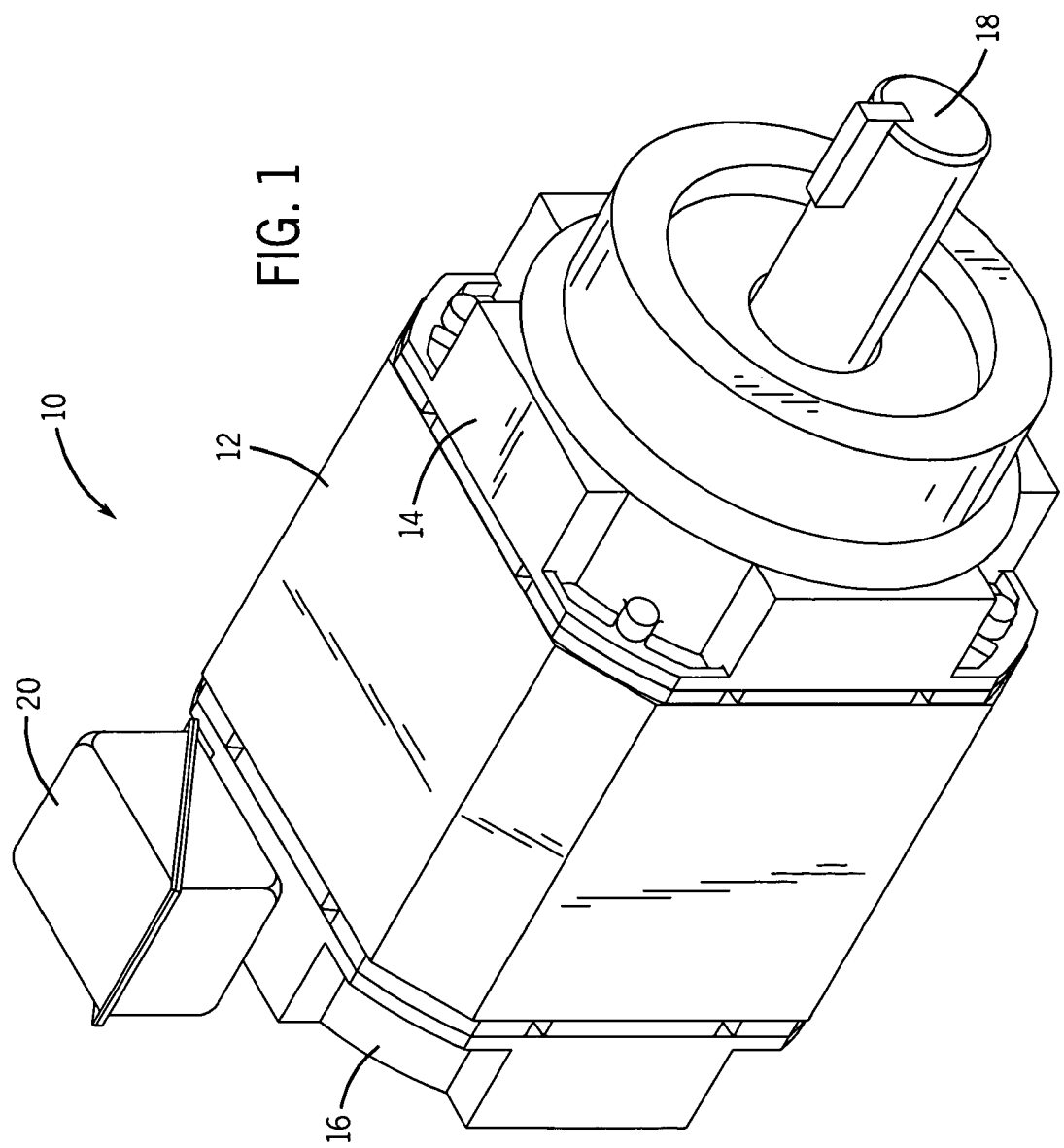
FIG. 1 is a perspective view of an exemplary electric motor illustrating the various functional components of the motor in accordance with certain aspects of the invention.

Turning now to the drawings, and referring first to FIG. 1, an electric motor is shown and designated generally by the reference numeral 10. In the embodiment illustrated in FIG. 1, motor 10 is an induction motor housed in a conventional enclosure. Accordingly, motor 10 includes a frame 12 open at front and rear ends and capped by a front end cap 14 and a rear end cap 16. Frame 12, front end cap 14, and rear end cap 16 form a protective shell, or housing, for a stator and a rotor. Stator windings are electrically interconnected to form groups, and the groups are, in turn, interconnected in a manner generally known in the art. The windings are further coupled to terminal leads (not shown). The terminal leads are used to electrically connect the stator windings to an external power cable (not shown) coupled to a source of electrical power. Energizing the stator windings produces a magnetic field that induces rotation of the rotor and a rotary shaft 18. The electrical connections between the terminal leads and the power cable are housed within a conduit box 20.

In the embodiment illustrated, the rotor may include a cast rotor supported on a rotary shaft 18 within the frame 12, front end cap 14 and rear end cap 16. As will be appreciated by those skilled in the art, the shaft 18 is configured for coupling to a driven machine element (not shown), for transmitting torque to the machine element. The rotor and the shaft 18 may be supported for rotation within frame 12 by a front bearing set and a rear bearing set carried by the front end cap 14 and the rear end cap 16, respectively. The motor 10 may include a cooling fan within the frame 12 or end caps 14 and 16 to promote convective heat transfer through the frame 12. The frame 12 generally includes features permitting it to be mounted in a desired application, such as mounting bracket or integral mounting feet.

As will be appreciated by those skilled in the art, while reference is made herein to a specific motor design, many different types of machines and motors may employ detectors and temperature detection systems based upon the present techniques. For example, many different motor frame sizes, ratings and styles may benefit from the improved temperature detector designs. Similarly, motors operating on different electrical principles may receive the detectors, including induction motors, synchronous motors, and so forth. Also, application of the detectors is not limited to single phase or three phase motors, but either type may require detection of temperature of windings and, as such, may use detectors constructed in accordance with the principles set forth herein.

Figure 2:
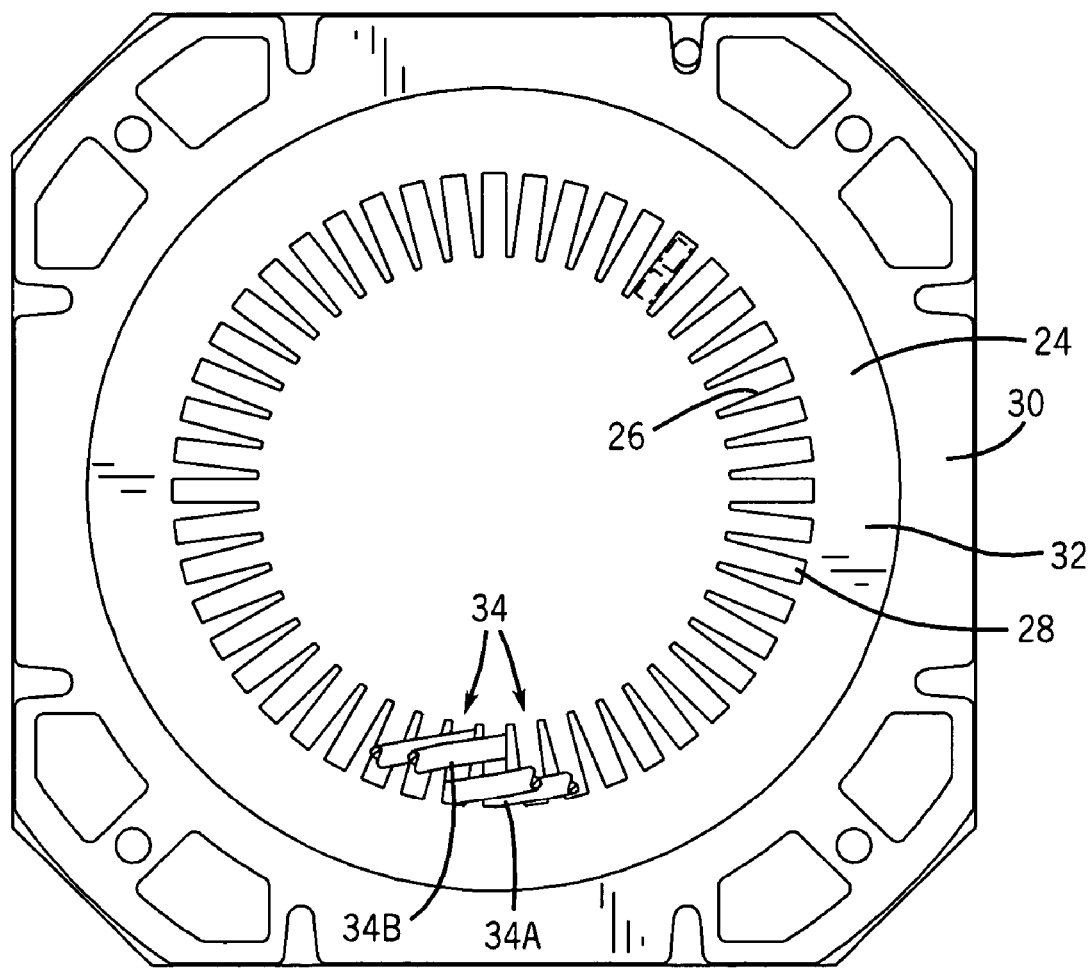
FIG. 2 is a front view of the frame and stator assembly of the electric motor of FIG. 1.

Referring generally to FIG. 2, a cross-sectional view of a partial motor is shown and designated generally by the reference numeral 22. As depicted in FIG. 2, the partial motor 22 includes a stator assembly 24. The stator assembly 24 may include a group of laminations 26 which are stacked adjacent to each other, as shown, or a group of segments that extend the entire length of the stator core, or any other suitable configuration. The laminations 26 are generally made of a ferromagnetic material, such as steel or another iron alloy. Each of the laminations 26 has slots 28 that align with the same features of the other laminations 26 to form continuous slots through the entire length of the stator assembly 24. With regard to the slots 28, the general shape of the slots 28 may vary depending on the specific features and design requirements. For instance, the slots 28 may include rectangular shapes (e.g. with a notched tooth for retaining a top wedge) or may be halved elliptical shapes, halved polygon shapes, or a generally elliptical shape with a portion of one end removed for insertion of the windings into the slots during manufacture of the stator.

Where the stator assembly 24 is made up of laminations 26, the laminations 26 may be kept in a compressed bundle under pressure to maintain a specific form and to retain the alignment of the slots 28. To maintain this lamination pressure, end plates 30 may be formed to the same general dimensions as the frame 12 (see FIG. 1). The end plates 30 are used to hold the laminations 26 of the stator assembly 24 in a generally fixed position. The end plates 30 are able to maintain pressure on the laminations 26 by being secured on opposite sides of the laminations 26. As will be appreciated by those skilled in the art, the particular construction of the stator assembly 24 described and shown herein is intended as an example only. Many other designs, laminated and otherwise, may be envisaged and may benefit from use of the detectors described below.

Slot liners 42 (FIG. 3) may be disposed within slots 28. As a means of supporting a portion of slot liners 42 that extend beyond the slots 28, an insulating end piece or insulating end lamination 32 may be positioned at each end of the laminations 26. While such structures may not be common in some machine designs, such as form-wound motors, they are discussed here for the sake of completeness. Where used, the insulating end lamination 32 may include any insulating material, such as a moldable plastic material or composite material or structure, and may be a single continuous component, such as a ring or other shape.

As shown in FIG. 2, the end plates 30 may be formed to the same general dimensions as the frame 12 and typically have a central opening. Located within the central opening of each end plate 30 is the insulating end lamination 32. As discussed above, the insulating end lamination 32 supports the portion of the slot liners 42 that extends beyond the laminations 26. Within each of the slots 28, two windings or coils 34 are placed, designated as 34A and 34B. In the illustrated embodiment, the stator coils are single or stacks of conductive elements or formed rectangular wire (e.g. form wound coils). It should be noted that the windings may, alternatively include strands of conductive material, such as copper wire, which are bundled together to form the coil 34. When reference is made herein to the windings, or one or more winding conductors, it should be thus understood that the conductor or conductors may be a single element or a bundle of elements, such as many strands of wire. The coils 34 pass thru the slots 28 and are disposed over the slot liners 42. The coils 34 pass through end plates 30 and the insulating end lamination 32 to extend beyond these components. The method of inserting the coils 34 may vary as will be appreciated by those skilled in the art. Each of the slots 28 may include a single coil 34 or a plurality of different coils 34 (typically two), depending on the specific design. For example, in one embodiment, each of the slots 28 may have two coils 34A and 34B, with each coil 34A or 34B typically extending in opposite directions along the insulating end lamination 32 to enter into different slots of the stator. As will also be appreciated by those skilled in the art, a wide range of winding patterns may be used, including lapped patterns, concentric patterns, and hybrid patterns.

Figure 3:
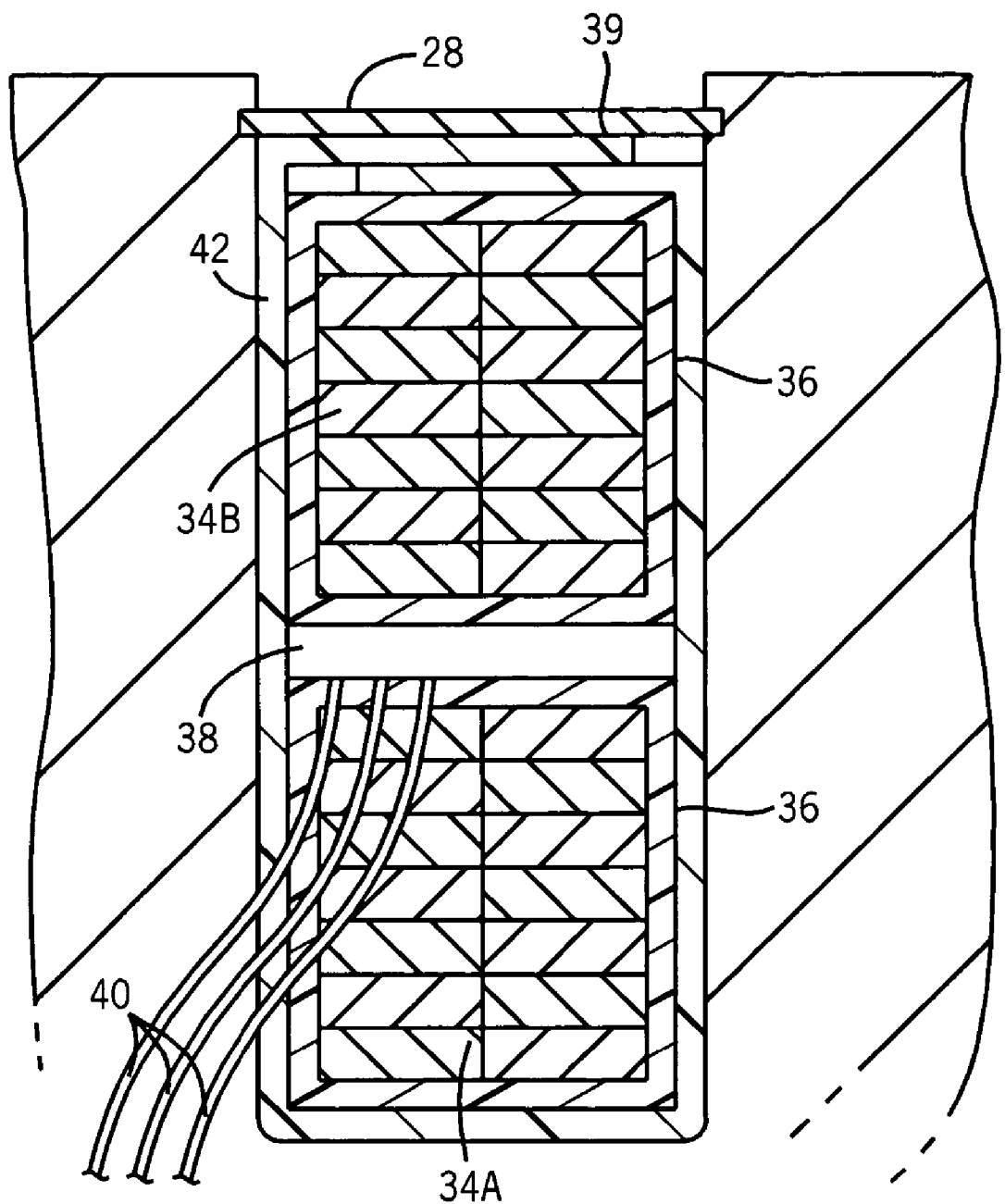
FIG. 3 is a cross-sectional view of an individual slot in the stator assembly of the exemplary electric motor with components disposed therein.

A cross-section of an individual slot 28 is generally shown in FIG. 3 with components disposed therein. As discussed above, the slot 28 may include a slot liner 42 disposed within the slot 28 and extending through the entire stator assembly 24. The slot liner 42 may include any insulating material generally known by those skilled in the art, and may include a single insulating layer or multiple layers of such material. The slot liner 42 may be as long as the slots 28 or may extend beyond the slots 28. Each winding 34A and 34B is shown enclosed within winding insulation 36. Winding insulation 36 may be any insulating material known by those skilled in the art and may consist of one or a plurality of insulating layers. Resistance temperature detector 38 is shown positioned within slot 28, between insulated windings 34A and 34B. Resistance temperature detector 38 allows measurement of the operating temperature within slot 28, with input and output signals being communicated via lead wires 40. In a typical application, an insulating "stick" is positioned between the windings of each slot to separate the windings from one another and to aid in preventing shorts. However, in those slots that receive a temperature detector, no such sticks may be provided, or partial-length sticks may be provided on one or both ends of the temperature detector to separate the portions of the windings not separated from one another by the detector. Also as shown in FIG. 3, in certain designs a retaining element 39 or wedge may be placed at the opening of each slot and retained by teeth or grooves.

Figure 4:
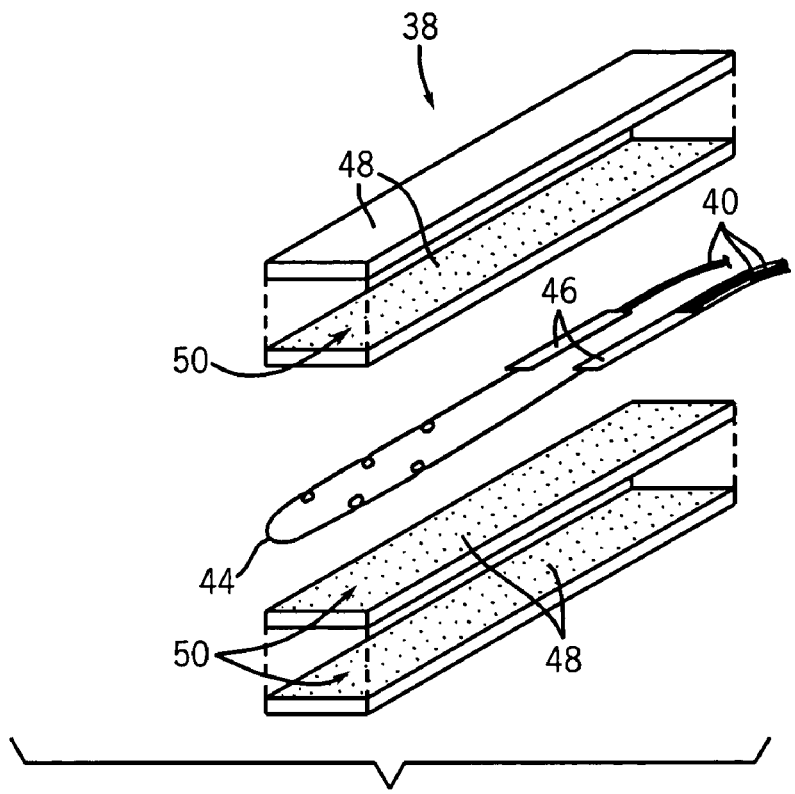
FIG. 4 is an illustration of the various components of an exemplary resistance temperature detector in accordance with certain aspects of the invention.

The individual components of an exemplary resistance temperature detector 38 are illustrated in FIG. 4. In this embodiment, lead wires 40 are electrically coupled to resistive element 44 by means of connection plates 46. Lead wires 40 may be used to perform a variety of functions, including supplying a measurement input signal, detecting an output signal, and permitting compensation for differences between the resistive properties of the leads (i.e. due to their lengths). Resistive element 44 typically comprises a very fine conductive wire, which may be formed from platinum, copper, nickel, or any other suitable conductive material. Further, a resistive element 44 may take any number of forms. For instance, resistive element 44 may be wound around a mandrel, may be disposed in various patterns, or may be etched into another material. Any form may be used in accordance with the present technique so long as the resistive element 44 provides the functionality described herein. Lead wires 40 and connection plates 46 will often be made of copper, but like resistive element 44, either or both may be formed of any other suitable material, including platinum or nickel.

Resistive element 44 is enclosed within an insulating system comprising insulation panels 48 and adhesive 50. Exemplary insulation panels 48 comprise a flexible insulating material, such as polyimide film, although other insulating materials or molding processes (e.g. for molded insulating systems) may also be used with the present technique. Such materials are commercially available from a number of sources, such as from E.I. Du Pont De Nemours & Co., under the commercial designation Kapton. Other suitable materials may include polyester, polyamide-imide, polyetheretherketone, polysulfone and polyphenylene sulfide. These insulation panels 48 are bound to each other and to resistance element 44 by adhesive 50, which may be an acrylic, an epoxy, or any other suitable substance with suitable properties. The resistive properties of resistive element 44 vary in a predictable manner as a function of temperature. Thus, the potential difference between the two ends of resistive element 44 may be measured as current is applied to the element. The resistance of resistive element 44 may be calculated from the voltage drop through the element, and a corresponding temperature may be determined based upon the known relationship between the temperature of the element and its resistance.

Figure 5:
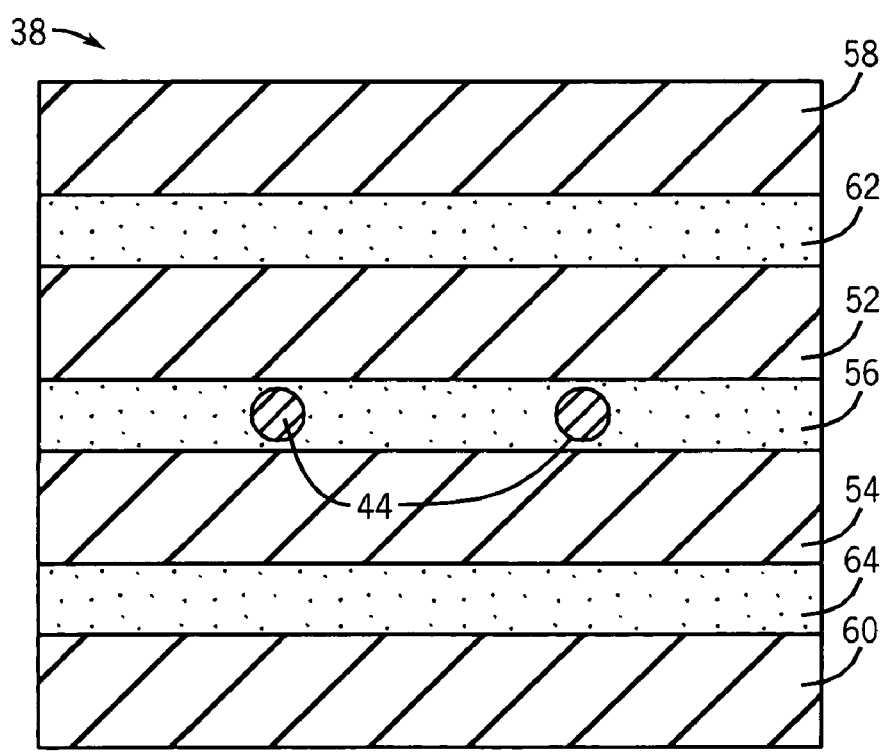
FIG. 5 is a cross-sectional view of the assembled exemplary resistance temperature detector of FIG. 4.

A cross-section of an assembled exemplary resistance temperature detector 38 is depicted in FIG. 5. As can be seen in the illustration, the resistive element 44 of resistance temperature detector 38 is enclosed within layers of insulation panels 48 and adhesive 50. Specifically, resistive element 44 is shown between insulation panels 52 and 54, within an adhesive layer 56. Adhesive layer 56 binds insulation panels 52 and 54 together. Insulation panels 58 and 60, which are bonded to insulating panels 52 and 54 by adhesive layers 62 and 64 respectively, provide further insulation for resistive element 44.

As described more fully below, it has been found that during operation, high potential differences may be developed between the windings of the stator and the resistive element of detector 38. Essentially, the resistive element may appear as a virtual or solidly fixed ground path for current applied to the stator, and potential differences between the stator windings and the resistive element may reach very high levels, particularly when the motor is inverter-driven. The detector, and indeed the winding and detector system are designed, however, to withstand such environments while preventing partial discharge breakdown within the detector as described below. The improved detector design and structure, then, prevent premature failure of the detector resistive element, or at least significantly prolong its life.

The permittivity of any dielectric material, relative to the permittivity of a vacuum, may be expressed as a ratio known as its dielectric constant. The collective layers of insulation panels 48 and adhesive 50 have a permittivity sufficiently high to reduce the voltage stress level of any air gaps or voids, or low dielectric materials (or other locations where partial discharge may occur) within resistance temperature detector 38 to a level below that at which partial discharge would occur under the operating conditions of the machine. Exemplary winding insulation 36, insulation panels 48, and adhesive 50, have similar dielectric constants sufficiently high to prevent partial discharge, such as between approximately 3 and 6, but other materials with dielectric constants outside this range, or even widely varying dielectric constants, may be used if the collective materials are sufficient to reduce partial discharge. Such a construction extends the durable life of resistance temperature detector 38 and allows it to be placed in more severe electrical environments.

Figure 6:
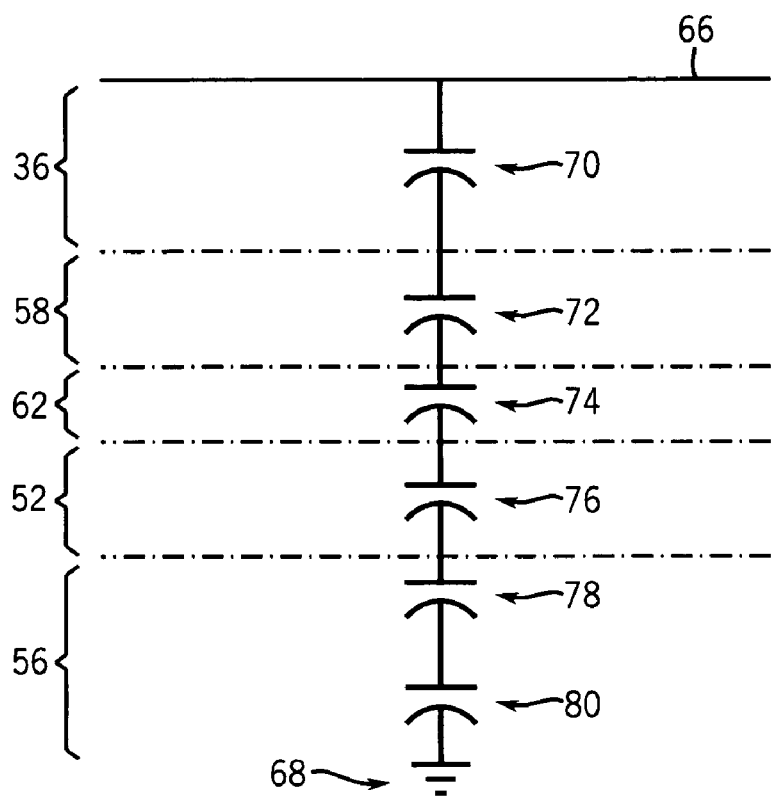
FIG. 6 is a model of an equivalent electrical circuit representative of the capacitive characteristics of exemplary layers between a winding and an element of a resistance temperature detector disposed in a slot of a stator core in accordance with certain aspects of the invention.

Certain electrical properties of the various exemplary insulation and adhesive layers shown between a winding 34B and resistive element 44, in FIGS. 3 and 5, are modeled in the form of equivalent circuits in FIGS. 6 and 7. The equivalent capacitance of each layer disposed between resistive element 44 and winding 34B within a slot 28 is represented in FIG. 6, while the corresponding capacitive reactance of each layer is represented in FIG. 7. The capacitance and reactance of the entire system of insulation and adhesive layers is modeled between an outer surface 66 of a winding 34B and resistive element 44, which is depicted as virtual or solidly fixed ground 68. Moving from this outer surface 66 to ground 68, any electrical signal would have to pass through the following layers: winding insulation 36, with an equivalent capacitance 70 and reactance 82; outer temperature detector insulation panel 58, with an equivalent capacitance 72 and reactance 84; outer temperature detector adhesive layer 62, with an equivalent capacitance 74 and reactance 86; inner temperature detector insulation panel 52, with an equivalent capacitance 76 and reactance 88; and inner temperature detector adhesive layer 56, with an equivalent capacitance 78 and reactance 90. Also modeled is a capacitance 80 and reactance 92 corresponding to an air void within adhesive layer 56. Note that where no void 80 is present, the equivalent circuit would, of course, be different due to the elimination of the air void from the series circuit (i.e. from between capacitance 78 and ground 68), resulting in a different capacitance 78.

Each layer of the insulation system and its corresponding reactance impedes the flow of current through the system. The reactance of each layer of the insulating system opposes the flow of current through each layer in an amount inversely proportional to the capacitance of each layer. Thus, as the capacitance of each layer increases, its capacitive reactance decreases. The voltage stress across each layer is proportional to its reactance. Particularly, the ratio of the voltage stress across one layer to the voltage stress across the entire system is equal to the ratio of the reactances of the one layer and the entire system. Accordingly, increasing the capacitance of any particular layer decreases the corresponding reactance of the layer as well as the voltage stress across the layer. Because the potential difference across the entire circuit does not change, the decrease of voltage stress across one layer is redistributed to the other layers in an amount proportional to their respective reactances. In accordance with the present technique, the layers of the winding and resistance temperature detector insulation systems comprising winding insulation 36, insulation panels 48, and adhesive 50, are selected to reduce the voltage stress across any air gaps or other low dielectric materials disposed adjacent to resistive element 44.

Paschen's Law essentially states that the breakdown voltage of any gap between two materials is a function of the product of the pressure of the gas inside the gap and the distance between the two materials. The breakdown voltage of air, as predicted by Paschen's Law, is graphically represented in FIG. 8. The graph represents the minimum voltage required at each pressure-distance product necessary for breakdown, and consequent partial discharge, to occur. This pressure-distance product is shown along the horizontal axis of the graph, while the corresponding breakdown voltage is shown along the vertical axis. The minimum breakdown voltage for air is 327 volts, corresponding to a pressure-distance product of approximately 5.7 Torr-mm. At this minimum point, a higher pressure-distance product results in too many electron collisions within the gas for breakdown to occur, while a lower pressure-distance product presents too few. As shown by the graph, the voltage required to breakdown the air in the gap increases as the pressure-distance product deviates from this minimum. Accordingly, the layers of resistance temperature detector 38 have dielectric constants such that the voltage stress across any air gaps remains below the breakdown voltage of the gap corresponding to the pressure and size of the gap. As would be understood by those skilled in the art, temperature may affect the minimum breakdown voltage in several ways, such as by altering the pressure within the gap or changing the electrical properties of each layer between coil winding 34 and resistive element 44.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims. For example, while multiple layers of insulating material are illustrated in the embodiment presented above, a single, or even more layers, or molded systems may be provided where desired. Such considerations will be based upon such factors as the insulating properties of the materials and the potential differences likely to be encountered in operation. Similarly, additional elements may be provided in the detector, such as partial insulating pieces adjacent to ends of the detector (lengthwise) to establish adequate insulation paths at those locations that are at least as robust as those offered by the layered materials on either side of the resistive element.

The invention claimed is:

1. A resistance temperature detector suitable for detecting temperatures between windings of an electrical machine, each winding including a conductor at least partially surrounded by a winding insulating system having a predetermined capacitance per unit area, the detector comprising:

a resistive element configured to receive an input signal via a lead and to produce an output signal that is a function of temperature;

a detector insulating system disposed about and completely encasing the resistive element, the detector insulating system having a capacitance per unit area approximately equal to or greater than the capacitance per unit area of the winding insulating system, wherein the detector insulating system includes a plurality of layers of a flexible insulating material and a plurality of layers of an adhesive disposed between the layers of flexible insulating material.

2. The resistance temperature detector of claim 1, wherein individual materials comprising the winding insulating system and the detector insulating system have dielectric constants between approximately 3 and 6.

3. The resistance temperature detector of claim 1, wherein the flexible insulating material comprises polyimide, polyester, polyamide-imide, polyetheretherketone, polysulfone or polyphenylene sulfide.

4. The resistance temperature detector of claim 1, wherein the adhesive is selected from the group consisting of acrylic, epoxy, silicone, polyester, and polyurethane adhesive systems.

5. A resistance temperature detector suitable for detecting temperatures between windings of an electrical machine, the detector comprising:

a resistive element configured to receive a measurement signal and to produce an output signal that is a function of temperature;

a detector insulating system disposed about and completely encasing the resistive element, the detector insulating system having a capacitance per unit area of sufficient magnitude that a voltage stress level experienced by any air voids or low dielectric materials adjacent to the resistive element resulting from voltage applied to the windings during operation is below a stress level that would cause partial discharge in such voids and materials, wherein the detector insulating system includes a plurality of layers of a flexible insulating material and a plurality of layers of an adhesive disposed between the layers of flexible insulating material.

6. The resistance temperature detector of claim 5, wherein partial discharge in the air voids occurs at a breakdown voltage predicted by Paschen's Law.

7. The resistance temperature detector of claim 5, wherein the voltage stress level that would cause partial discharge is a function of temperature of the air voids or low dielectric materials.

8. The resistance temperature detector of claim 5, wherein individual materials comprising a winding insulating system and the detector insulating system have dielectric constants between approximately 3 and 6.

9. The resistance temperature detector of claim 5, wherein the flexible insulating material comprises a polyimide, polyester, polyamide-imide, polyetheretherketone, polysulfone or polyphenylene sulfide.

10. The resistance temperature detector of claim 5, wherein the adhesive is selected from the group consisting of acrylic, epoxy, silicone, polyester, and polyurethane adhesive systems.

* * * * *